US008845226B2

(12) United States Patent
Binothman

(10) Patent No.: US 8,845,226 B2
(45) Date of Patent: Sep. 30, 2014

(54) FEATHER IMPING PIN

(71) Applicant: Albara Mohammed Binothman, Portland, OR (US)

(72) Inventor: Albara Mohammed Binothman, Portland, OR (US)

( * ) Notice: Subject to any disclaimer, the term of this patent is extended or adjusted under 35 U.S.C. 154(b) by 0 days.

(21) Appl. No.: 13/757,348

(22) Filed: Feb. 1, 2013

(65) Prior Publication Data

US 2014/0215775 A1 Aug. 7, 2014

(51) Int. Cl.
*F16B 7/00* (2006.01)
*F16B 21/00* (2006.01)

(52) U.S. Cl.
CPC ...................................... *F16B 21/00* (2013.01)
USPC ............ 403/292; 403/297; 403/298; 403/229

(58) Field of Classification Search
CPC ................................. F16B 12/24; F16B 21/00
USPC .................................. 403/292–298, 229, 280
See application file for complete search history.

(56) References Cited

U.S. PATENT DOCUMENTS

| | | | | |
|---|---|---|---|---|
| 1,354,549 A * | 10/1920 | Gilmer | 403/280 |
| 1,429,200 A * | 9/1922 | Fotacos | 403/280 |
| 3,352,191 A * | 11/1967 | Crawford | 403/292 |
| 3,883,258 A * | 5/1975 | Hewson | 403/292 |
| 4,070,119 A * | 1/1978 | Duer | 403/292 |
| 4,332,399 A * | 6/1982 | Kepple | 403/229 |
| 6,719,793 B2 | 4/2004 | McGee | |
| 2009/0210006 A1* | 8/2009 | Cohen et al. | 606/232 |

FOREIGN PATENT DOCUMENTS

| | | |
|---|---|---|
| CN | 201350321 Y | 11/2009 |
| FR | 2 754 142 A1 | 4/1998 |
| WO | WO 01/49190 A1 | 7/2001 |

OTHER PUBLICATIONS

Falconry Forum (IFF)—Traditional Imping Needles, available to public Aug. 25, 2012-Aug. 26, 2012. retrieved from the internet on Sep. 17, 2013, http://www.falconryforum.co.uk/printthread.php?t=121926&pp=40[Sep. 17, 2013 7:40:37 PM].*

Wayne J. Trimm, A Return to Imping, Nov. 10, 2002, retrieved from the internet on Sep. 17, 2013, http://www.dvrconline.org/rehabtdbt.html[Sep. 17, 2013 7:33:51 PM].*

Falconry Forum (IFF)—Advice/Suggestions Please, available to public Dec. 8, 2006-Dec. 13, 2006, retrieved from the internet on Sep. 17, 2013, http://www.falconryforum.co.uk/showthread.php?t=20993&page=3[Sep. 17, 2013 7:18:35 PM].*

U.S. Appl. No. 13/764,151, filed Feb. 11, 2013, Binothman.

Apprentice Falconry :: Raptor Health and Management :: Injuries, Sickness, and Treatment :: Photo Guide to Imping; Thread Started on Jan 19, 2005; http://apfalconry.proboards.com/index.cgi?board=health&action=display&thread=2672; pp. 1-8.

(Continued)

*Primary Examiner* — Victor MacArthur
(74) *Attorney, Agent, or Firm* — Oblon, Spivak, McClelland, Maier & Neustadt, L.L.P.

(57) ABSTRACT

A feather imping pin with roughened surface is described that attaches a donor feather to a receiving feather. The feather imping pin is inserted into a receiving feather shaft of the receiving feather. Feather imping is performed using the feather imping pin that connects the donor feather and the receiving feather. The feather imping pin fits inside both the receiving feather shaft of the receiving feather and a donor feather shaft of the donor feather.

7 Claims, 13 Drawing Sheets

(56) References Cited

OTHER PUBLICATIONS

Daniel E. Varland, John A. Smallwood, Leonard S. Young, and Michael N. Kochert; "Marking Techniques"; pp. 221-236.

Journal of Wildlife Rehabilitation; vol. 29, Nos. 2-3 2008; Brenda J. Zaun, Scott Sims, DVM, Kathy Batha, Marilou Knight, Colett Welch, Cathy Granholm, and Keith Swindle; "Feather Imping and Rehabilitation of a Red-tailed Tropicbird (*Phaethon rubricauda*)" cover page and pp. 22-26.

* cited by examiner

FEATHER IMPING PIN

GRANT OF NON-EXCLUSIVE RIGHT

This application was prepared with financial support from the Saudi Arabian Cultural Mission (SACM), and in consideration therefore the present inventor has granted The Kingdom of Saudi Arabia a non-exclusive right to practice the present invention.

BACKGROUND

Cross Reference to Related Applications

The present application contains subject matter related to that described in commonly owned Saudi application No. 110310420, filed May 19, 2012, at the Saudi Arabian General Directorate of Industrial Property Filing and Granting, the contents of which being incorporated herein in its entirety in the present application.

FIELD OF THE DISCLOSURE

This disclosure relates to a feather imping pin, and more specifically, to a feather imping pin with a roughened surface.

SUMMARY

This disclosure describes a feather imping pin.

A feather imping pin attaches a donor feather to a receiving feather, the feather imping pin includes a shaft that is cylindrical with two ends and a diameter sized to slide within a receiving feather shaft of the receiving feather, and a donor shaft of the donor feather such that the shaft has a roughened surface, and the shaft fits into the receiving feather shaft of the receiving feather on one end and fits into a donor feather shaft of the donor feather on the other end so that the opposing shaft ends of the receiving feather and donor feather oppose one another and interconnect the receiving feather to the donor feather.

According to one embodiment, the feather imping pin is made of materials that have similar density to that of a feather and has similar flexibility to that of a feather.

According to one embodiment, the feather imping pin has a roughened surface.

According to one embodiment, the feather imping pin has a toothed surface. The teeth on the feather imping pin surface protrude outward. According to one embodiment, the teeth are tilted against the pin surface. According to one embodiment, the teeth are tilted in different directions against the pin surface to secure the feather imping pin within a receiving and/or a donor feather, and prevent rotation of the receiving and/or donor feather around the feather imping pin, and/or prevent movement of the receiving and/or donor feather along the feather imping pin.

According to one embodiment, the feather imping pin has a grooved surface. The grooves on the feather imping pin surface may be longitudinal, around an axis of the feather imping pin, or any combination thereof.

According to one embodiment, the feather imping pin has one or more roughened ends. Each roughened end may include a spring attached to that end.

According to one embodiment, the feather imping pin is extendable. The feather imping pin may be extendable via one or more spring-loaded sections along the feather imping pin.

According to one embodiment, there is provided a method of imping feather via a feather imping pin that is light and flexible as a feather and has a roughened surface.

According to one embodiment, glue is applied to the feather imping pin to make the pin more secure and more coherently attached.

According to one embodiment, a kit is provided for quick feather imping. The kit may include any of the disclosed feather imping pin embodiments. The kit may include a feather imping cutter. The kit may include a measurement device to measure the cross-section or other size of the receiving and/or donor feather. The kit may include a marker to mark the receiving and or donor feather before cutting. The kit may include glue for more secure and coherent feather imping.

The disclosed embodiments may be used for imping different types of feather.

BRIEF DESCRIPTION OF THE DRAWINGS

A more complete appreciation of the present application and many of the advantages thereof will be readily obtained as the same becomes better understood by reference to the following detailed description when considered in connection with the accompanying drawings, wherein.

DETAILED DESCRIPTION

Figure 1:
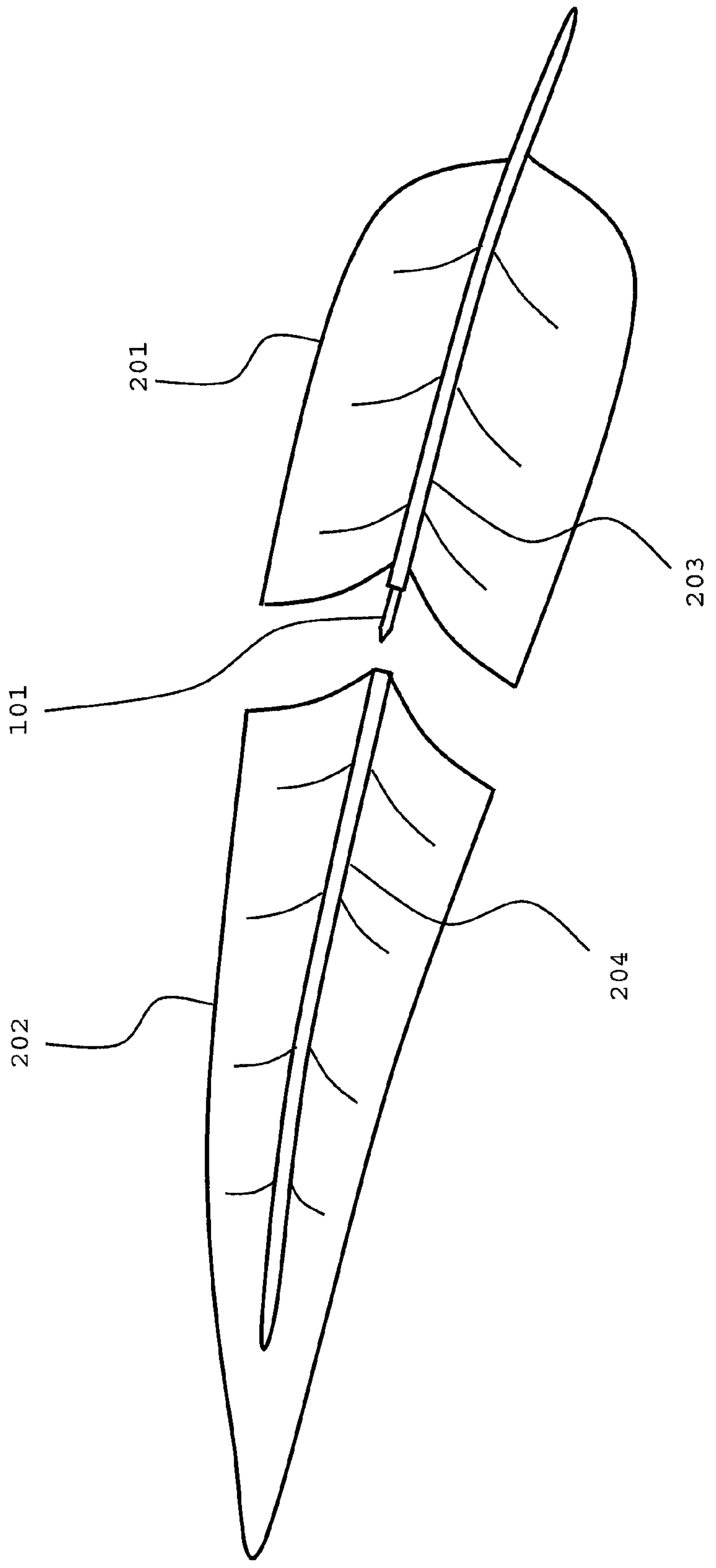
FIG. 1 is an exemplary embodiment of a donor feather, a receiving feather, and a feather imping pin that attaches the donor feather to the receiving feather such that the feather imping pin is inserted into a shaft of the receiving feather.

Referring now to the drawings, FIG. 1 illustrates an exemplary embodiment of a donor feather 202, a receiving feather 201, and a feather imping pin 101 that attaches the donor feather 202 to the receiving feather 201 such that the feather imping pin 101 is inserted into a broken shaft 203 of the receiving feather 201. In most cases, the receiving feather 201 is still attached to an avian but a natural end portion of the avian's feather is missing, damaged or otherwise ineffective.

Figure 2:
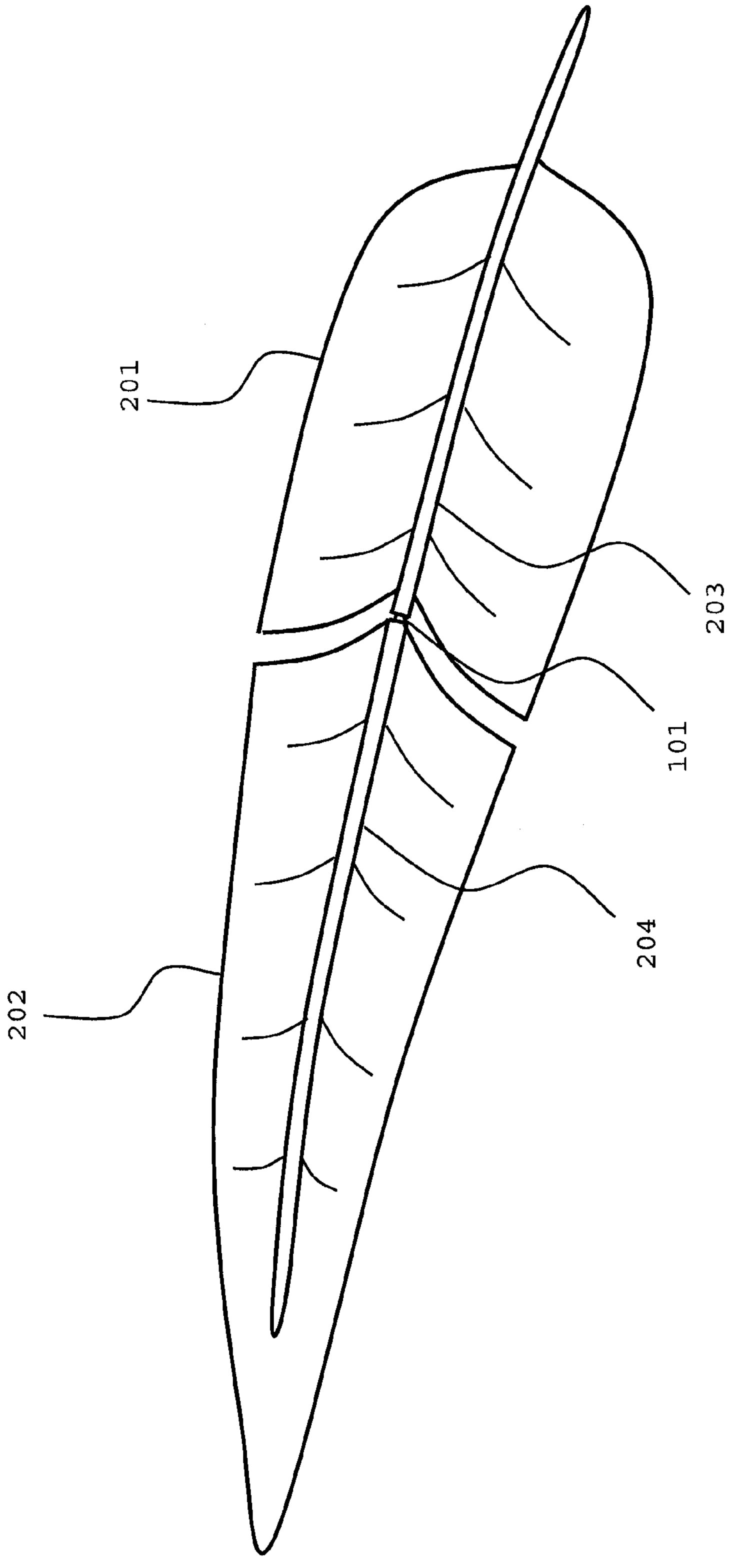
FIG. 2 is an exemplary embodiment of a donor feather, a receiving feather, and a feather imping pin that attaches the donor feather to the receiving feather such that the donor feather and the receiving feather are connected to each other using the feather imping pin.

FIG. 2 illustrates an exemplary embodiment of the donor feather 202, the receiving feather 201, and the feather imping pin 101 after the donor feather 202 and the receiving feather 201 are connected to each other by the feather imping pin 101.

Feather imping is performed using the feather imping pin 101 that connects the donor feather 202 and the receiving feather 201. The feather imping pin 101 fits inside both the broken shaft 203 of the receiving feather 201 and the newly cut shaft 204 of the donor feather 202. The feather imping pin 101 fits tightly inside both the broken shaft 203 and the newly cut shaft 204. The feather imping pin 101 may be inserted inside the broken shaft 203 and newly cut shaft 204 symmetrically or asymmetrically. For example, a ratio of a length of the feather imping pin 101 that is inserted into the broken shaft 203 to a length of the feather imping pin 101 that is inserted into the newly cut shaft 204 may be 1:1, 0.8:1, 1:0.8, 1:0.5, or 0.5:1. The feather imping pin 101 may include one or more marks to indicate a length to be inserted into the broken shaft 203 and the newly cut shaft 204. The feather imping pin 101 may be further secured/fixed with glue or other adhesive. Examples of glues and adhesives that can be used to further secure the feather imping pin 101 include, but are not limited to, cyanoacrylate, super glue, and epoxy.

The receiving feather 201 is usually attached to an avian but may also be a feather that is detached from an avian. The feather imping process may be performed to fix the feather of the avian as a medical aid. The avian may be sedated while the feather imping is being performed. Alternatively, the feather imping may be performed to only fix a detached feather. The feather imping may be used to connect one or more than one donor feather to the receiving feather or donor feather. For example, feather imping may be performed to connect a second donor feather to a first donor feather that is already connected to the receiving feather.

Figure 3:
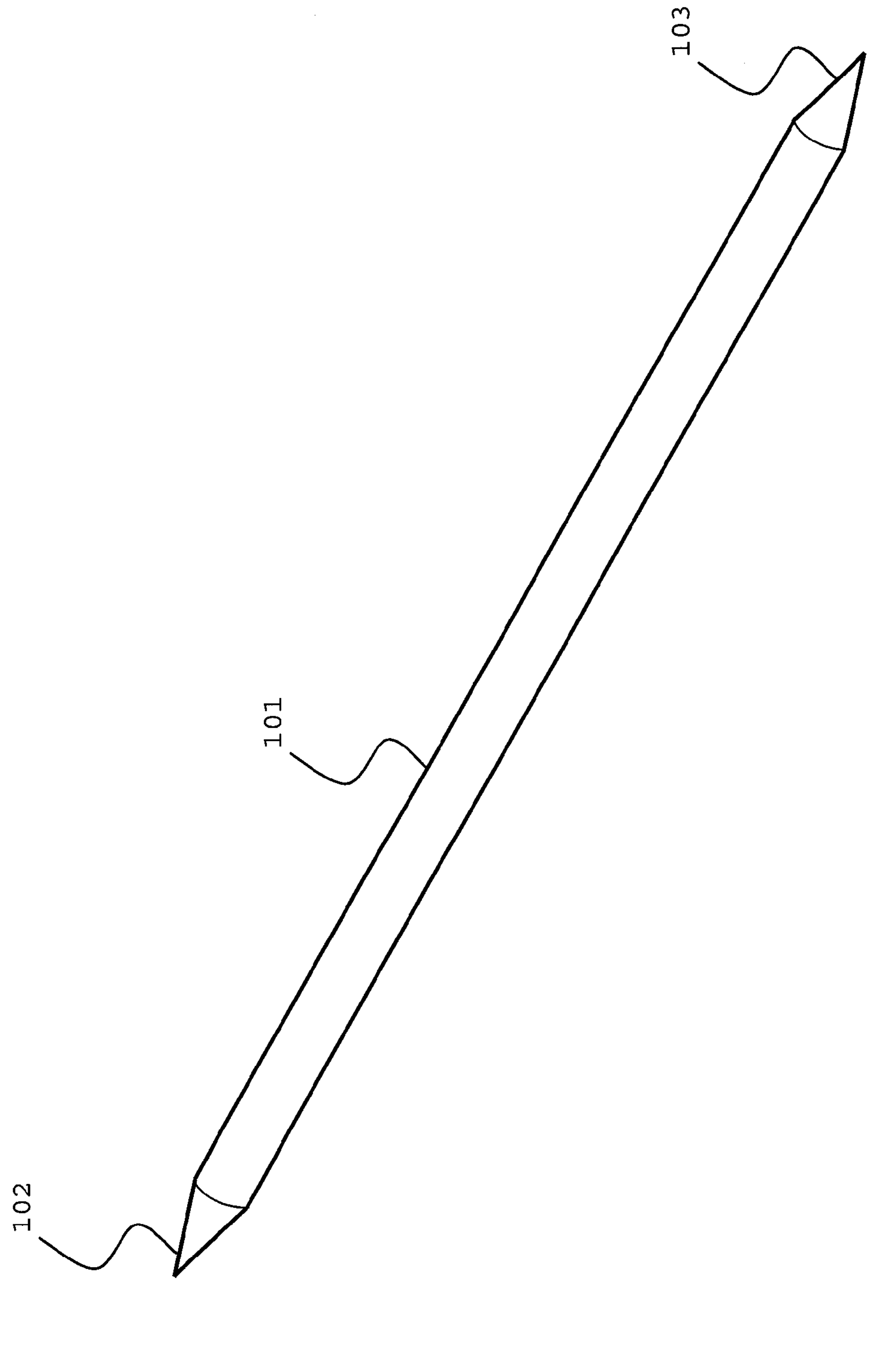
FIG. 3 is an exemplary embodiment of a feather imping pin having two ends such that the two ends have a same size.

FIG. 3 illustrates an exemplary embodiment of the feather imping pin 101 having a shaft that is cylindrical with two tapered ends 102 and 103 such that the two ends 102 and 103 have the same shape and size. The feather imping pin 101 may have different dimensions based on a type and a size of the receiving feather 201 and the donor feather 202. For example, the feather imping pin 101 may be 5, 10, 20, 30, 40, 50, 100, 150, 200 mm long. In other embodiments, a length of the feather imping pin 101 may be any value in the range from 2 mm to 300 mm. The feather imping pin 101 diameter may be in the range from 0.1 mm to 5 mm. Various sizes of feather imping pins may be included in a kit, where the sizes are pre-set depending on the avian species being treated. It should be noted that a size and a diameter of the feather imping pin 101 may be different in other embodiments and the functionality of the feather imping pin 101 is independent of a size and a dimension of the feather imping pin 101. The taper of the two ends 102 and 103 of the feather imping pin 101 may be cone-shaped with a sharp tip, cone-shaped with a rounded tip, or oval-shaped (half-egg-shaped). The two ends 102 and 103 of the feather imping pin 101 may have the same shape or may have different shapes. The feather imping pin 101 may have different colors to match a color of the feather or a color of the feather shaft. Optionally, the feather imping pin 101 may include a GPS receiver and a wireless transmitter with a battery power source so the avian that receives the feather imping pin 101 may be tracked and/or located remotely.

The feather imping pin 101 may be made of materials having a similar density as of the feather. Additionally, the feather imping pin 101 may be made of materials having a similar flexibility as of the feather. Alternatively, feather imping may be performed using the feather imping pin 100 that is flexible or non-flexible. Examples of materials that the feather imping pin 101 can be made of include, but are not limited to, titanium, aluminum, fiber glass, carbon fiber composite, and/or plastic.

Figure 4:
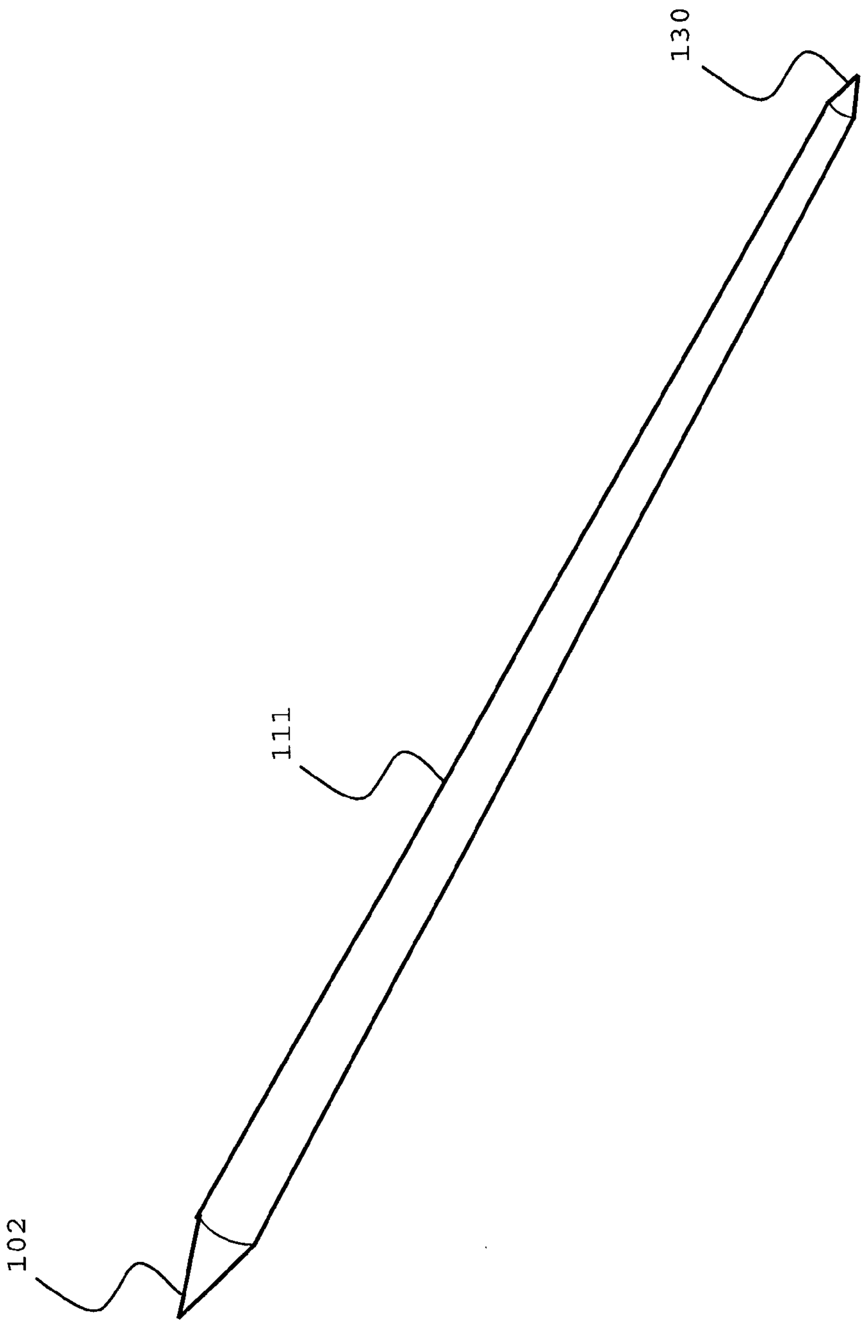
FIG. 4 is an exemplary embodiment of a feather imping pin having two ends such that the two ends have different sizes.

FIG. 4 illustrates an exemplary embodiment of a feather imping pin 111 having two ends 102 and 130 such that the two ends 102 and 130 have different sizes, and that the diameter of the feather imping pin 111 at the one end 130 is smaller than the diameter of the feather imping pin 101 at the other end 102. The diameter of the feather imping pin 111 at each of the two ends 102 and 130 is selected based on an inner or outer diameter of the broken shaft 203 of the receiving feather 201 and an inner or outer diameter of the newly cut shaft 204 of the donor feather 202. For example, a diameter of the broken shaft 203 of the receiving feather 201 may be larger than a diameter of the newly cut shaft 204 of the donor feather 202. In this case the feather imping pin 111 is inserted into the broken shaft 203 from the end having the larger diameter, which is 102.

Figure 5B:
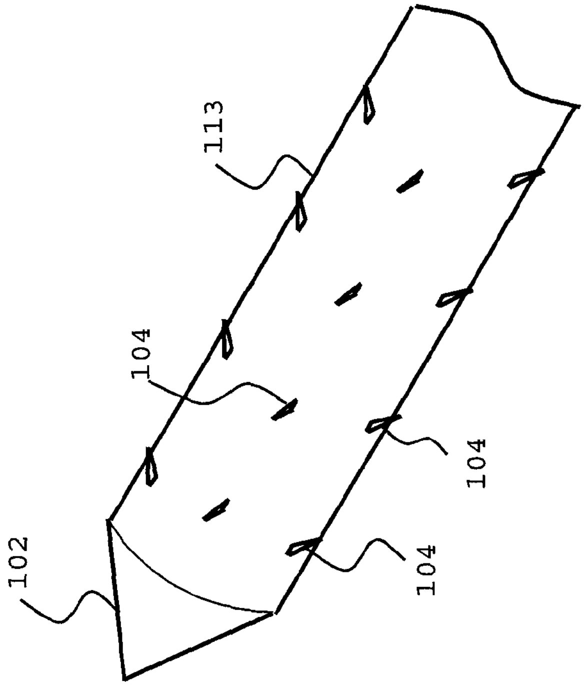
FIG. 5*b* is an exemplary close-up view of an exemplary embodiment of a feather imping pin with tilted teeth, where the tilted teeth are tilted in opposite directions.
Figure 5A:
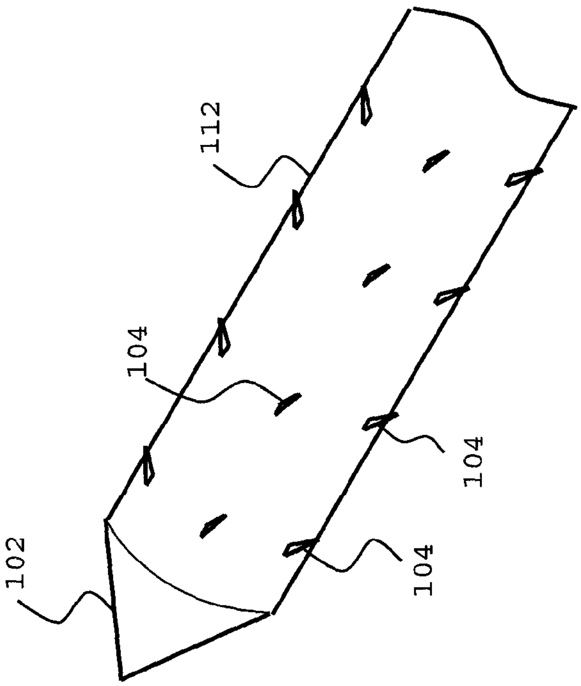
FIG. 5*a* is an exemplary close-up view of an exemplary embodiment of a feather imping pin with tilted teeth, where the tilted teeth are tilted in a same direction.

FIG. 5*a* and FIG. 5*b* are close-up views of exemplary embodiments of feather imping pins 112 and 113 with tilted teeth 104, where the tilted teeth 104 are tilted in a same direction or in opposite directions, respectively. The tilted teeth 104 may be a first group of teeth close to the one end of the shaft tilted at a first angle, for example, 15°, 20°, 30°, or 45°, against the surface of the shaft, and a second group of teeth close to the other end of the shaft tilted at a second angle, for example, 15°, 20°, 30°, or 45°, against the surface of the shaft. Preferably, the first angle and second angle is between 5° and 50°.

It should be noted that when the feather imping pins 112 and 113 does not have tilted teeth 104, upon pressure to the feather after performing the feather imping, the donor feather 202 may rotate around the feather imping pins 112 and 113 or move along the feather imping pins 112 and 113, causing the feather to break again after the feather imping, which results in a need for re-imping the broken feather. Performing the feather imping with feather imping pins 112 and 113 having the tilted teeth 104 provides an advantage that the feather imping results in a more durable feather imping and a lower likelihood of a re-break of the feather. The feather imping pins, as disclosed in this application, may be made entirely from one material or may be made of a combination of different materials. For example, the tilted teeth 104 of the feather imping pins 112 and 113 may be made of a metal that is assembled on a plastic rod. Additionally, the tilted teeth 104 may cover the surface of the feather imping pins 112 and 113 entirely or partially.

Figure 6C:
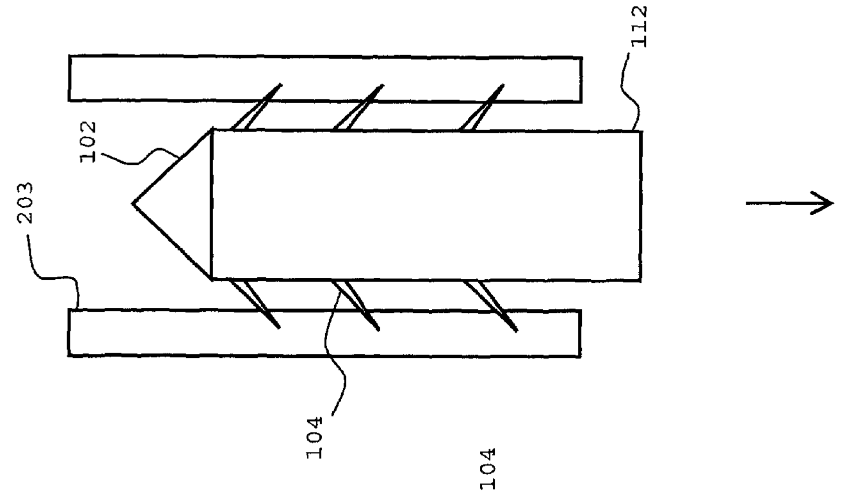
FIGS. 6*a*, 6*b*, and 6*c* are exemplary cross sectional close-up views of an exemplary embodiment of a feather imping pin with tilted teeth, where the tilted teeth are tilted in a same direction, and the feather imping pin is being inserted into a feather shaft and the tilted teeth are getting engaged with the feather shaft.
Figure 6B:
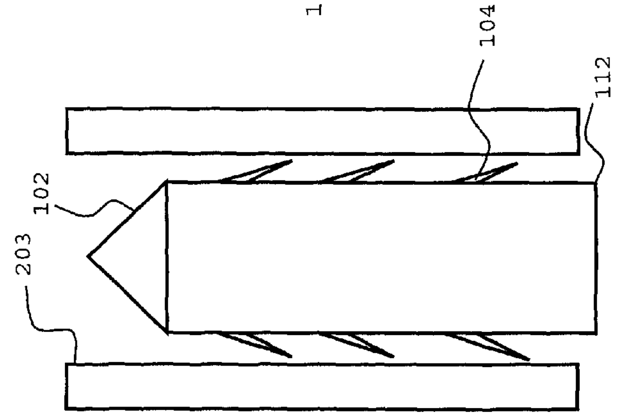
Figure 6A:
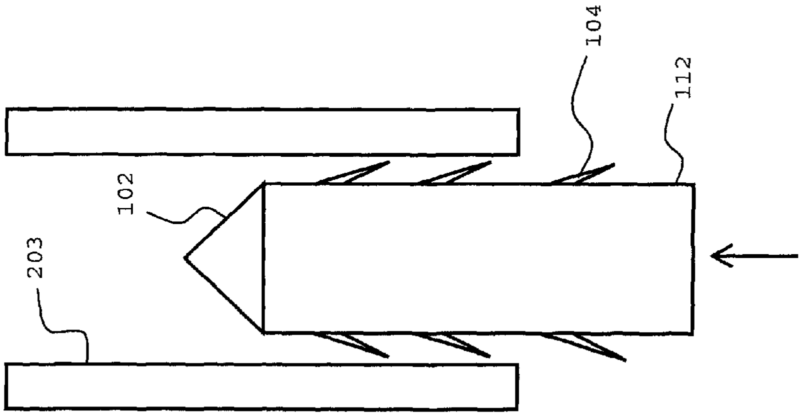
Figure 7:
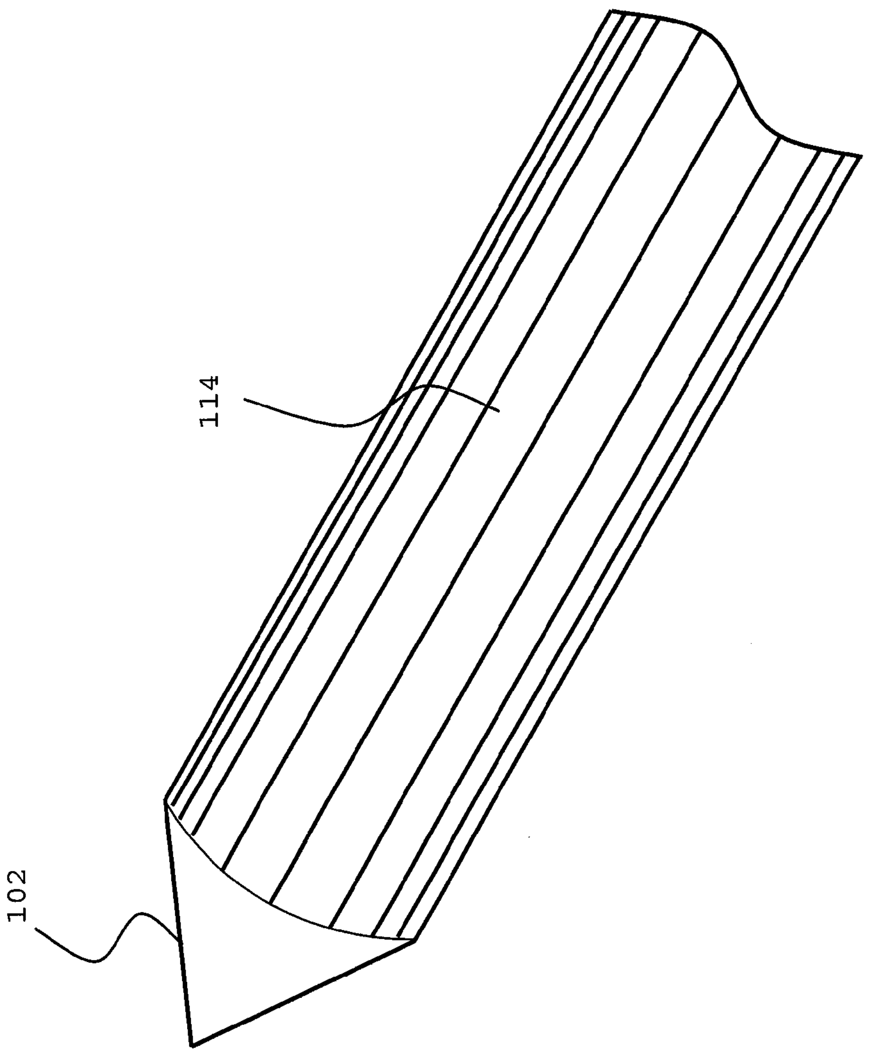
FIG. 7 is an exemplary close-up view of an exemplary embodiment of a feather imping pin with longitudinal grooves.
Figure 8:
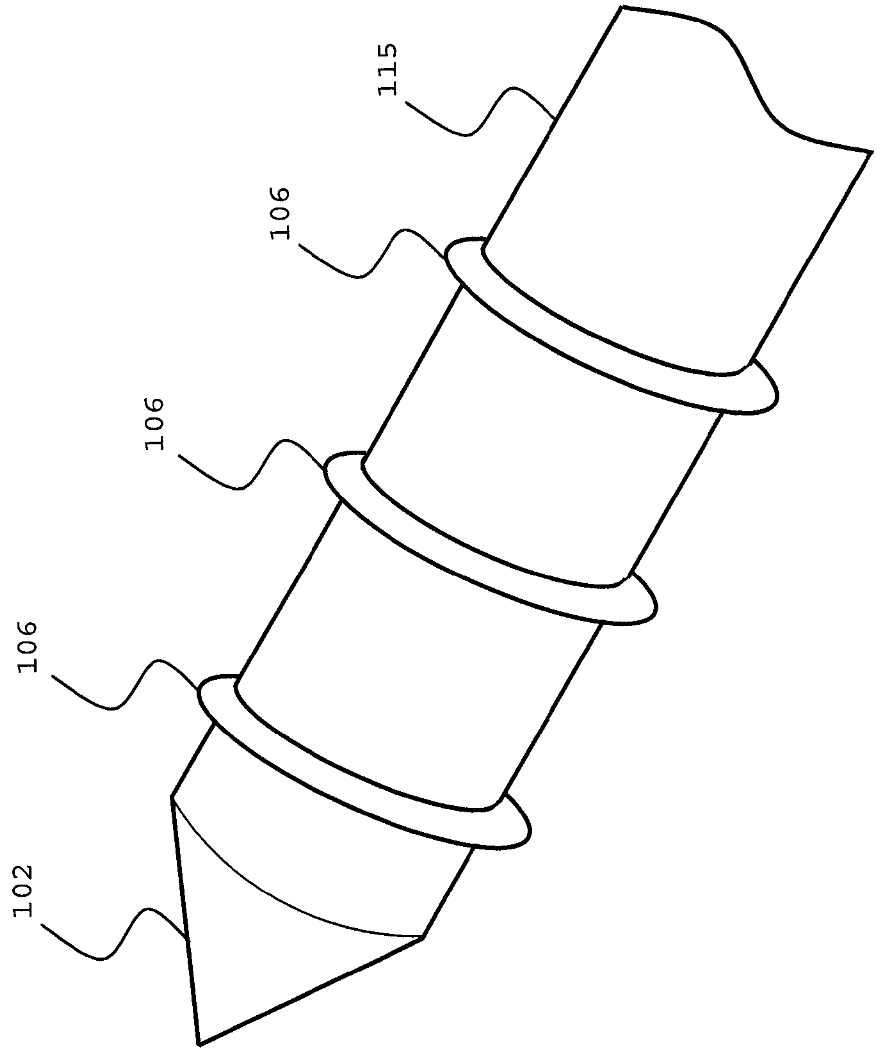
FIG. 8 is an exemplary close-up view of an exemplary embodiment of a feather imping pin with circular grooves.
Figure 9:
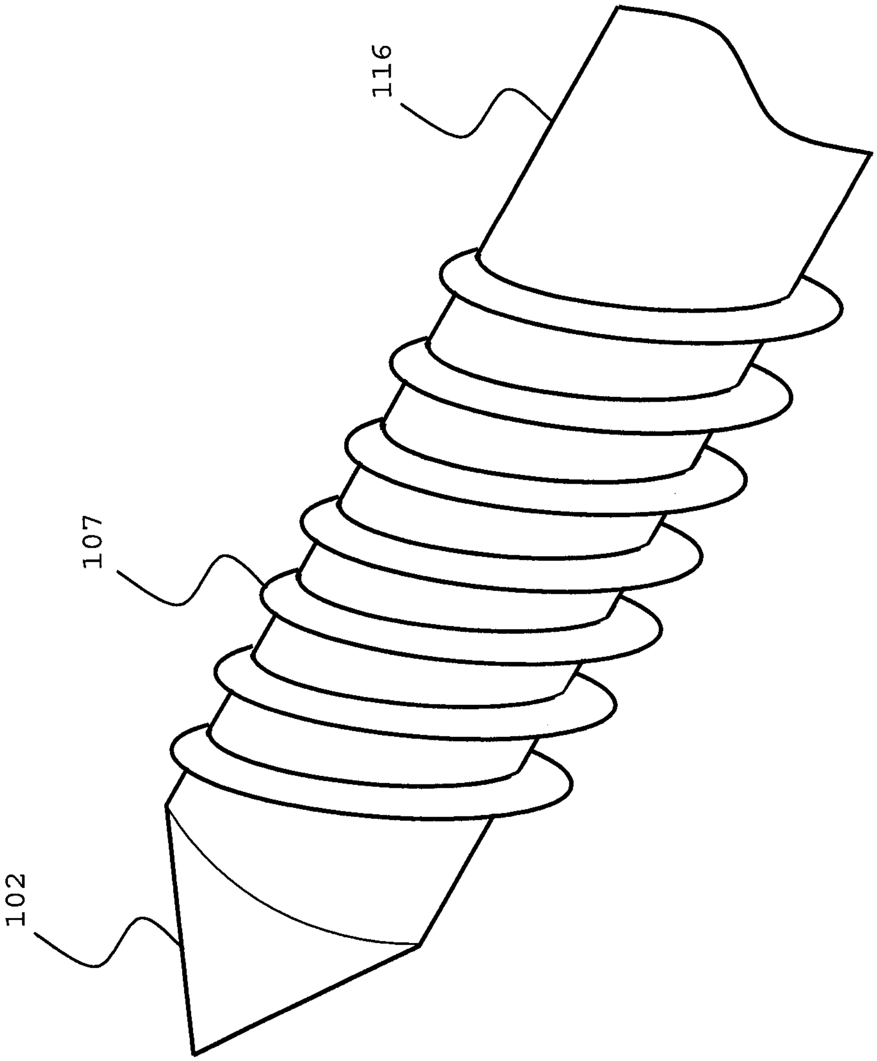
FIG. 9 is an exemplary close-up view of an exemplary embodiment of a feather imping pin with spiral grooves.
Figure 10:
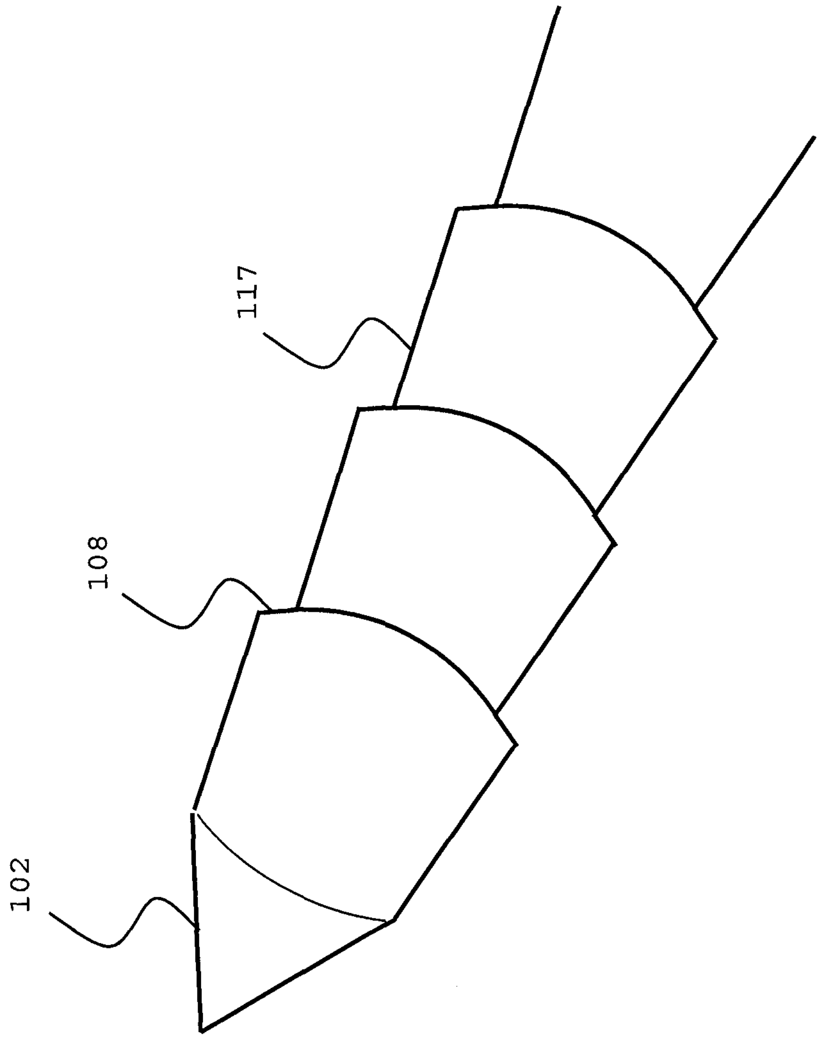
FIG. 10 is an exemplary close-up view of an exemplary embodiment of a feather imping pin with half-cone grooves.

FIGS. 6*a*, 6*b*, and 6*c* illustrate exemplary cross sectional close-up views of an exemplary embodiment of the feather imping pin 112 with tilted teeth 104, where the tilted teeth 104 are tilted in a same direction, and the feather imping pin 112 is being inserted into the broken shaft 203. As shown in FIG. 6*a*, while inserting the feather imping pin 112 into the broken shaft 203 of the receiving feather 201, the tilted teeth 104 are not engaged with the inner surface of the broken shaft 203. In this case, while inserting the feather imping pin 112 into the broken shaft 203, the tilted teeth 104 slide in the inner surface of the broken shaft 203. In order to secure/fix the feather imping pin 112 in the broken shaft 203, the feather imping pin 112 is inserted to the broken shaft 203 and then moved back/out. While retracting the feather imping pin 112, the sharp heads of the tilted teeth 104 of the feather imping pin 112 are engaged with, and penetrate into, the inner surface of the broken shaft 203, which result in securing the feather imping pin 112 inside the broken shaft 203. The same procedure can be applied when inserting the feather imping pin 112 into the newly cut shaft 204.

FIGS. 7, 8, 9, and 10 illustrate exemplary close-up views of various embodiments of the feather imping pins 114, 115, 116, 117 with roughened surfaces of longitudinal grooves 114, circular grooves 106, spiral grooves 107, and half-cone grooves 108, respectively. The roughened surfaces may cover the surface of the feather imping pins entirely or partially. For example, the roughened surface may only cover the areas close to the two ends 102 and 103 of the feather imping pins. The feather imping pins, as disclosed in the present application, may have only one of the above-noted roughened surfaces or may have any combination of the above-noted roughened surfaces. For example, the feather imping pins, as disclosed in the present application, may have half-cone grooves 108 at one half and may have spiral grooves 107 at the other half. It should be noted that the surface of the feather imping pins may be roughened with similar geometries and the above-noted examples are not aimed to limit the scope of the present application. Any similar roughened surfaces to secure the feather imping pin within the newly cut shaft 204 and/or the broken shaft 203, which prevents rotation of the receiving feather 201 and/or the donor feather 202 around the feather imping pin, and/or prevents movement of the receiving feather 201 and/or the donor feather 202 along the feather imping pin are also in the scope of this application. Additionally, the two ends 102 and 103 of the feather imping pin may be roughened.

Figure 11:
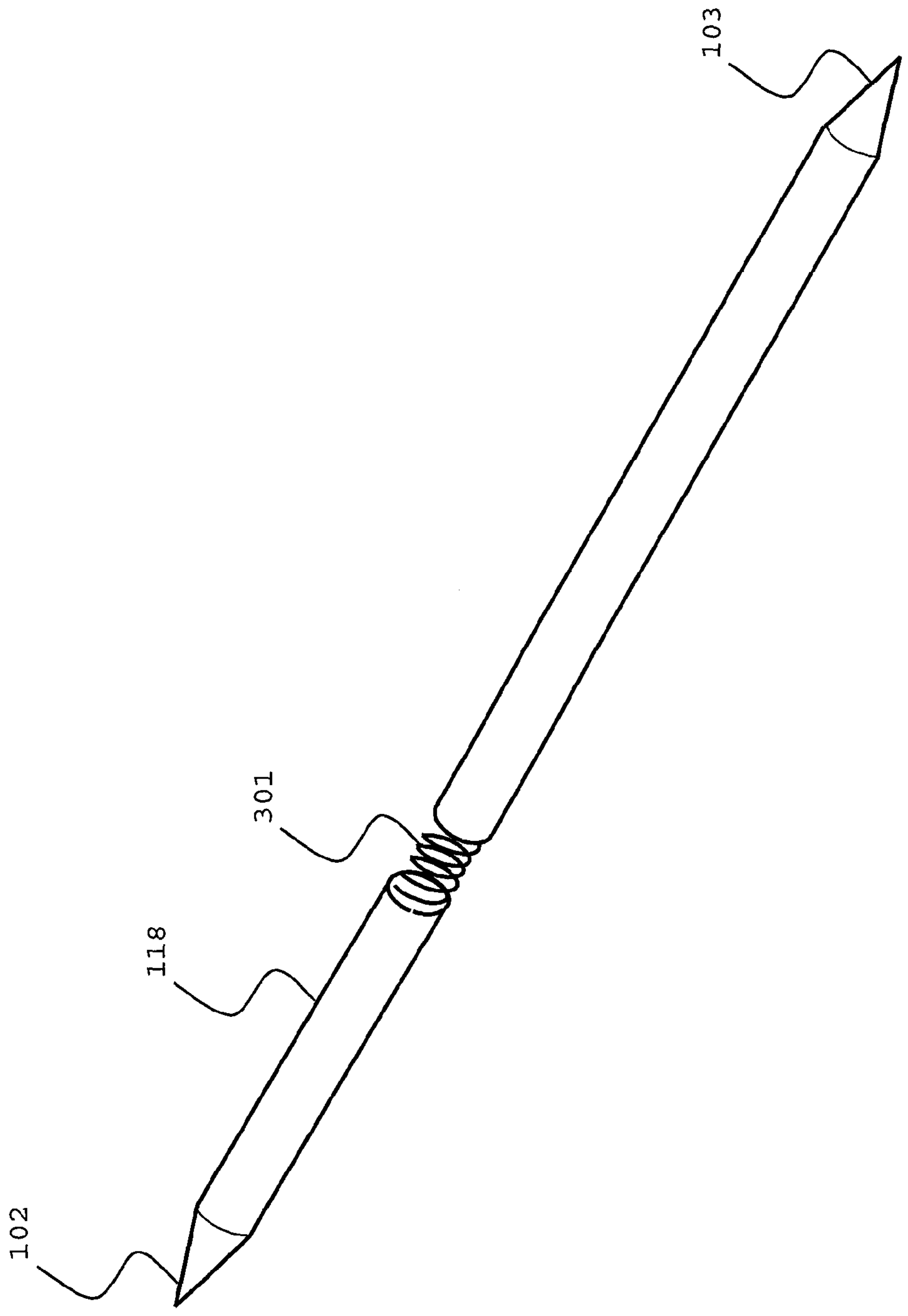
FIG. 11 is a an exemplary embodiment of a feather imping pin that is extendable via one spring-loaded section along the feather imping pin.

FIG. 11 illustrates an exemplary embodiment of a feather imping pin 118 that is extendable via one spring-loaded section 301 along the feather imping pin 118. The feather imping pin 101 may be extended via one or more spring loaded sections 301 along the feather imping pin 118. Additionally, the spring loaded section 301 may be used to add flexibility to the feather imping pin 118.

Figure 12:
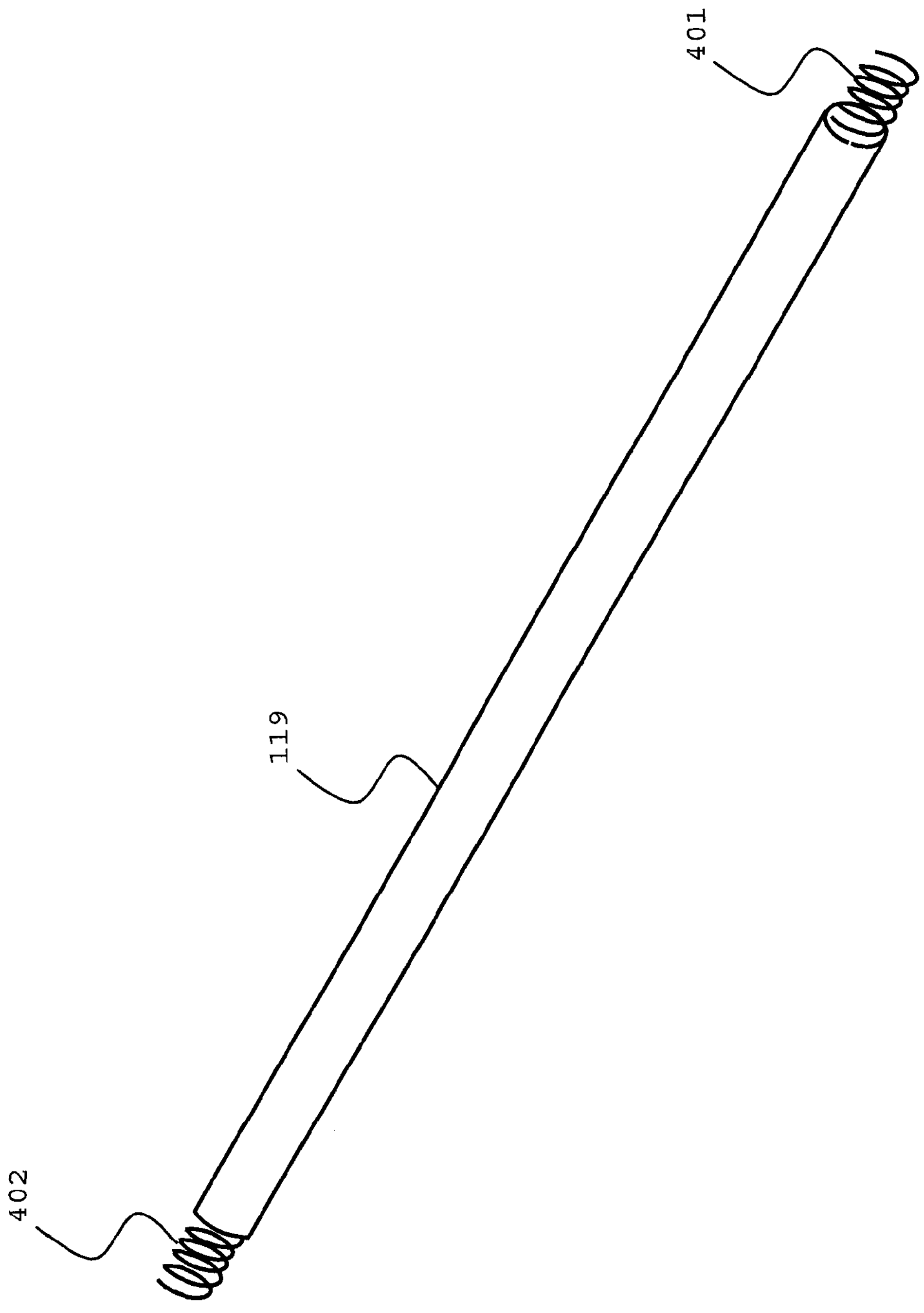
FIG. 12 is a an exemplary embodiment of a feather imping pin that is roughened at two ends using two springs.

FIG. 12 illustrates an exemplary embodiment of a feather imping pin 119 that is roughened at two ends using two springs 401 and 402. In this case, the surface of the feather imping pin 119 may be roughened similarly using the above-noted geometries for roughening the surface of the feather imping pin 119.

Figure 13:
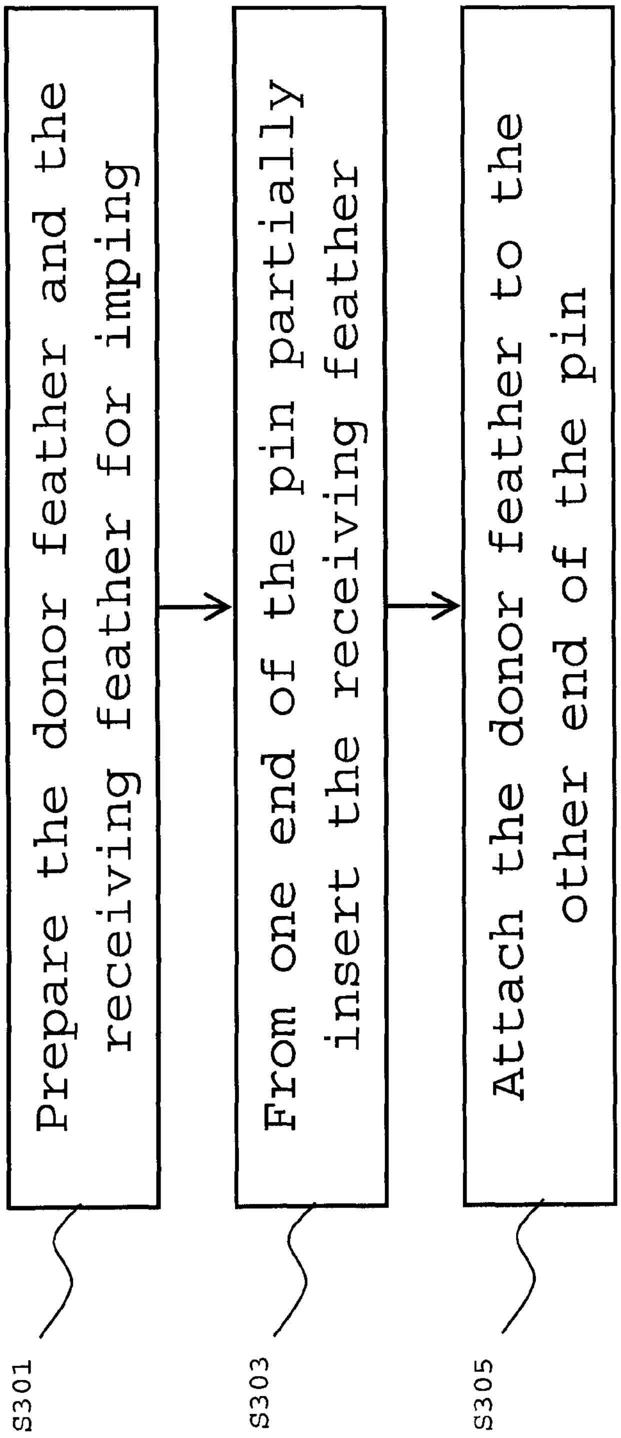
FIG. 13 is a flowchart of a method for imping a donor feather and a receiving feather using a feather imping pin.

FIG. 13 is a flowchart of a method for imping the donor feather 202 and the receiving feather 201 using a feather imping pin according to one embodiment. At step S301, the donor feather 202 and the receiving feather 201 are prepared. The preparation may include cutting the donor feather 202 and/or the receiving feather 201 to appropriate length. The donor feather 202 and/or the receiving feather 201 may be cut such that the sizes of the cross-sections of their corresponding shafts match. The circumference of the shafts may be measured and marked prior to cutting. It is preferred that the donor feather 202 and the receiving feather 201 to be from a same type and a same kind. However, different types and kinds of the donor feather 202 and the receiving feather 201 may be attached.

At step S303, the feather imping pin (any of the embodiments disclosed in the present application) is partially inserted into the broken shaft 203 of the receiving feather 201. Glue may be applied to the pin prior to insertion. The feather imping pin may be extended to a desirable length before insertion. The extension may be via releasing one or more spring-loaded extension portions along the shaft of the feather imping pin.

At step S305, the donor feather 202 is attached to the exposed end of the feather imping pin. Glue may be applied (in any embodiment) to the feather imping pin prior to attachment. Alternatively, the feather imping pin may be partially inserted into the newly cut shaft 204 of the donor feather 202, and then, the receiving feather 201 may be attached to the exposed end of the feather imping pin.

The feather imping pin is first partially inserted into the broken shaft 203 of the receiving feather 201. Then, the donor feather 202 can be attached to the exposed end of the feather imping pin, which is inserted into the newly cut shaft 204 of the donor feather 202. Alternatively, the feather imping pin may be first partially inserted into the newly cut shaft 204 of the donor feather 202, and then, the receiving feather 201 can be attached to the exposed end of the feather imping pin, which is inserted into the broken shaft 203 of the receiving feather 201. Glue may be applied to the feather imping pin prior to any of the above-noted insertions or attachments.

It is preferred that the donor feather is selected/cut such that, after attachment, the donor feather 202 and the receiving feather 201, collectively, look like an undamaged/full receiving feather 201. It is preferred that, if the feather imping is performed on an avian that is alive and has many broken feathers that needs to be fixed, the avian being sedated.

According to another embodiment of the present application, a kit may be provided for quick feather imping. The kit may include any embodiment of the disclosed feather imping pins as described in this application. Additionally, the kit may include a plurality of feather imping pins having different sizes and lengths. The kit may further include a feather imping cutter. The kit may further include a measurement device to measure the sizes, for example, a cross-section size of the receiving feather 201 and/or the donor feather 202. The kit may further include a marker to mark the receiving feather 201 and/or the donor feather 202 before cutting. The kit may include glue for more secure and coherent feather imping. The kit may be used to fix avian having broken feathers by imping broken feathers.

The foregoing discussion discloses and describes merely exemplary embodiments of the present application. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A feather imping pin that attaches a donor feather to a receiving feather, the feather imping pin comprising:

a shaft that is cylindrical with two ends and a diameter sized to slide within a receiving feather shaft of the receiving feather, and a donor shaft of the donor feather; and one or more spring loaded portions along the shaft that include a coil spring and is extendable along the feather imping pin to provide flexibility to the feather imping pin, wherein the shaft has a roughened surface, and the shaft fits into the receiving feather shaft of the receiving feather on one end and fits into a donor feather shaft of the donor feather on the other end so that the opposing shaft ends of the receiving feather and donor feather oppose one another and interconnect the receiving feather to the donor feather.

2. The feather imping pin according to claim 1, wherein the roughened surface is a plurality of teeth along the shaft and protruding outward from the shaft.

3. The feather imping pin according to claim 2, wherein the plurality of teeth are tilted against a surface of the shaft, and are tilted in a same direction.

4. The feather imping pin according to claim 3, wherein the plurality of teeth include:

a first group of teeth close to the one end of the shaft tilted at a first angle against the surface of the shaft; and a second group of teeth close to the other end of the shaft tilted at a second angle against the surface of the shaft.

5. The feather imping pin according to claim 1, wherein the roughened surface is one or more of longitudinal grooves along the shaft, and/or spiral grooves around the shaft or any combination of them.

6. The feather imping pin according to claim 1, wherein the material is one or more of titanium, aluminum, fiber glass, carbon fiber composite, and/or plastic.

7. A feather imping pin that attaches a donor feather to a receiving feather, the feather imping pin comprising:

a shaft that is cylindrical with two ends and a diameter sized to slide within a receiving feather shaft of the receiving feather, and a donor shaft of the donor feather, wherein the shaft has a roughened surface, and the shaft fits into the receiving feather shaft of the receiving feather on one end and fits into a donor feather shaft of the donor feather on the other end so that the opposing shaft ends of the receiving feather and donor feather oppose one another and interconnect the receiving feather to the donor feather, wherein the feather imping pin includes roughened ends each having a coil spring extending therefrom to provide a roughened surface at the roughened ends of the feather imping pin.

* * * * *